United States Patent Office 2,968,575
Patented Jan. 17, 1961

2,968,575
STABLE POLYURETHANE LATEX AND PROCESS OF MAKING SAME

James E. Mallonee, Wilmington, Del., assignor to E. I. du Pont de Nemours and Company, Wilmington, Del., a corporation of Delaware No Drawing. Filed May 21, 1954, Ser. No. 431,617

13 Claims. (Cl. 106—287)

This invention relates to the manufacture of high molecular weight reaction products of organic diisocyanates and more particularly to a process for chain extending such products in an aqueous bath.

The manufacture of elastomers by the reaction of organic diisocyanates with polyalkylene ether glycols of molecular weight above 750 is more particularly disclosed and claimed in U.S. Patent 2,929,800. In the manufacture of these elastomers, the initial addition product of the polyalkylene ether glycols and the organic diisocyanates may vary in consistency from an oily liquid to a heavy viscous semi-solid material. Upon the reaction of this initial addition product, or, as it is sometimes called, "prepolymer," with water or other chain extending agent, the mass becomes very tough and rubbery and because of its heavy consistency it is necessary to carry out the final condensation-polymerization reaction in heavy duty mixing equipment. During the working of this heavy viscous or rubbery mass, it is difficult to control the temperature of the reaction and to bring the reaction to a uniform state of completion without unnecessarily prolonging the time of working.

Similar problems are encountered with reaction products of diisocyanates and various other high molecular weight organic compounds containing active hydrogen atoms. Such products include those formed by reacting a diisocyanate with a poly(alkyleneether-alkylenethioether) glycol which has a molecular weight of at least 750 and which has terminal hydroxyl groups, and a chain-extender, as described and claimed in U.S. Patent 2,900,-368; reaction products of diisocyanates with polyesters containing terminal hydroxyl groups, as shown in United States Patents 2,333,639 to Christ et al., 2,621,166 to Schmidt et al., and 2,625,532 to Seeger; and reaction products of diisocyanates with polyesteramides as shown in U.S. Patent No. 2,424,883 to Habgood et al.

In the manufacture of polymers both in the elastomer and in the synthetic resin field, the polymerization of liquid monomer is often carried out in an aqueous emulsion system from which the final polymer may be coagulated or precipitated by various methods. Because organic diisocyanates readily react with water, however, the aqueous emulsion polymerization technique is not applicable to the initial reaction of polyisocyanates with high molecular weight active hydrogen-containing compounds.

It is an object of this invention to provide a method for carrying out the chain extension of addition products formed from high molecular weight organic compounds having terminal active hydrogens and organic diisocyanates while the said addition products are dispersed in an aqueous medium. It is a further object of the invention to provide a method for producing stable latices of the chain-extended addition products of organic diisocyanates and high molecular weight compounds containing active hydrogen atoms. It is a further object to provide latices of this type which can be employed for the preparation of articles by the dipping process or for other purposes, and from which the polymeric reaction product may be readily coagulated and worked in a manner similar to that in which natural and synthetic elastomers are recovered from their latices and worked up into useful products.

According to the present invention, high molecular weight reaction products are produced by reacting an organic compound containing at least two active hydrogen atoms and having a molecular weight of at least 750 with a stoichiomertic excess of an organic diisocyanate and, while the addition product is in the form of a syrupy liquid, emulsifying it in water or an aqueous solution of a chain extending agent of the class more particularly identified hereinafter. Where the initial addition product is too thick or viscous to emulsify properly in water, it can be diluted with an inert solvent and the resulting solution emulsified in the aqueous bath. Whether or not a solvent is used, an emulsifying agent is employed. The emulsifying agent may be added either to the initial addition product or to the water in which the addition product is to be emulsified, or may be formed in situ during addition of the addition product to the water.

In a preferred embodiment of this invention, a polytetramethylene ether glycol having a molecular weight between 750 and about 4000 is reacted with an aromatic diisocyanate, the molar ratio of glycol to diisocyanate being from 1:1.2 to 1:2, the reaction product is mixed with an organic acid containing at least 12 carbon atoms, the treated product is poured into at least an equal volume of water containing an alkali metal hydroxide and optionally an aromatic primary diamine, and the mixture is agitated vigorously, forming a stable latex. Some excess of the alkali metal hydroxide as compared with the amount of the organic acid should be used and the total amount of these ingredients should be sufficient that the weight of the resulting salt is from about 2 to 5% of the weight of water used.

Heretofore in the preparation of elastomers and other products from the starting materials employed in this invention, it was believed that unless the addition of water or other chain-extending agent to the initial addition product was carefully regulated, undesirable products would be obtained, since a large molar excess of water would be expected to tie up all the available —NCO groups to the extent that no such groups would be available for chain-extension reactions. (The maximum degree of chain extension is theoretically obtained when there are present stoichiometric proportions of the diisocyanate and the chain-extending agent.) It was therefore surprising to find that the solvent solution of the initial addition product or the initial addition product itself when it exists as a thin syrupy liquid can be added directly to a large body of water and still yield a product having desirable properties. One possible explanation is that the rate of diffusion of the water through the insoluble droplets of the initial addition product or its solvent solution as they are emulsified in water in the presence of efficient emulsifying agents is sufficiently slow that only enough water contacts the free isocyanato groups to produce the desired degree of chain extension.

Chain extenders other than water, which are water soluble, may be used as water solutions in forming these emulsions or latices where such chain extenders react more readily with the isocyanates than does water itself. Primary diamines are particularly active chain extenders which may be satisfactorily employed in this invention. When a diamine, such as 2,4-tolylene diamine, is present in chain-extending amount in the aqueous bath, it appears to be able to react preferentially so as to produce the desired degree of chain extension before the —NCO groups can react with the large excess of water which is present.

In general, any organic compound with a molecular weight above 750 which contains at least two active hydrogen atoms may be reacted with a stoichiometric excess of an organic diisocyanate to give a prepolymer or initial addition product which is then capable of a molecular weight increase through chain extension with water or an organic primary diamine according to the process of this invention. Active hydrogen-containing compounds of this sort include the polyalkylene ether glycols, the poly(alkyleneether-alkylenethioether)glycols, polyalkylene esters of alkylene diacids, polyalkylene esters of arylene diacids, esters of polyhydric alcohols and hydroxy fatty acids, alkyd resins containing hydroxyl or carboxyl end groups, and polyesteramide resins. The term "active hydrogen atoms" refers to hydrogens which, because of their position in the molecule, display activity according to the Zerewitinoff test as described by Kohler in J. Am. Chem. Soc., 49, 3181 (1927). Linear compounds containing hydrocarbon groups linked together by ether or ester linkages and having terminal hydroxyl groups are preferred representatives of this type of compound.

A particularly useful class of active hydrogen-containing compounds for this purpose are the polyalkylene ether glycols which have the general formula:

$$H(OR)_nOH$$

where R is an alkylene radical and $n$ is an integer sufficiently large that the compound as a whole has a molecular weight of at least 750. When polyalkylene ether glycols of lower molecular weight are used the product is generally not an elastomer. Molecular weights of up to 10,000 are satisfactory, the preferred range being from about 750 to about 4000. Polyethylene ether glycols, poly-1,2-propylene ether glycol, polytetramethylene ether glycol, poly-1,2-dimethylethylene ether glycol and polydecamethylene ether glycols are typical members of this class.

Poly(alkyleneether-alkylenethioether) glycols of molecular weight at least 750, as described in the above-referred to U.S. Patent 2,900,368, are also useful starting materials. These compounds resemble the polyalkylene ether glycols except that some of the alkylene radicals are joined by sulfur rather than oxygen. In each case these compounds have terminal hydroxyl groups, which take part in the reaction with the organic diisocyanate.

There may also be used as the high molecular weight active hydrogen-containing organic compound alkyd resin polyesters such as are formed by the reaction between glycols, such as ethylene glycol, diethylene glycol, triethylene glycol, trimethylene glycol, pentamethylene glycol, hexamethylene glycol, decamethylene glycol and the like, with dibasic acids such as malonic, succinic, glutaric, adipic, phthalic, terephthalic, hexahydroterephthalic and para-phenylenediacetic acids. The process is also applicable to other alkyd resins formed using glycerine or other polyhydroxy compounds with dibasic acids, as well as to esters of polyhydric alcohols and hydroxy fatty acids, such as glyceryl ricinoleate and castor oil. Another useful group of compounds for this purpose are the polyester amide resins described in U.S. Patent No. 2,424,883 of Habgood et al.

In addition to the high molecular weight active hydrogen-containing compound there may also be used smaller amounts of low molecular weight compounds such as diols, which have a modifying effect on the properties of the ultimate elastomer or plastic.

Any of a wide variety of organic diisocyanates may be employed in the reaction, including aromatic, aliphatic and cycloaliphatic diisocyanates and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, are preferred. In general they react more rapidly with the active hydrogen-containing compounds than do the alkylene diisocyanates. Compounds such as 2,4-tolylene diisocyanate in which the two isocyanato groups differ in reactivity are particularly desirable. The diisocyanates may contain other substituents, although those which are free from reactive groups other than the two isocyanato groups are ordinarily preferred. In the case of the aromatic compounds the isocyanato groups may be attached either to the same or to different rings. Dimers of the monomeric diisocyanates and di(isocyanatoaryl) ureas such as di(3-isocyanato-4-methylphenyl) urea, which are the subject of U.S. Patent 2,757,185, may be used.

The preparation of elastomers from polyalkylene ether glycols and organic diisocyanates wherein the intermediate addition product is reacted with water or other chain-extending agent to produce the elastomer directly in massive form, is more particularly described in U.S. Patent 2,929,800.

In producing polymers by the present invention, the molar ratio of the organic diisocyanate and the active hydrogen-containing compound is in most cases preferably maintained at from about 1.2:1 to 10:1. When using these molar ratios an initial addition product is obtained which is ordinarily a liquid, and, as illustrated by the examples hereinafter given, can be emulsified directly in an aqueous bath or can first be diluted with inert organic solvents and then emulsified in an aqueous bath. Where polyalkylene ether glycols are used in this process, molar ratios of organic diisocyanate to polyalkylene ether glycol higher than about 3:1 usually yield polymers which are more plastic than elastomeric. Similarly, polyalkylene ether glycols of higher molecular weight, i.e., above about 5,000–6,000, also tend to yield polymers of a more plastic character.

The amount of water to be employed in the formation of the emulsion is not critical, although in general the minimum amount will be equal to the volume of the initial addition product or the solvent solution or slurry of this product. When too small an amount of water is employed emulsions are obtained which are too thick to handle readily, while, on the other hand, dispersions which are too dilute are uneconomical to handle due to their excessive volume.

Any emulsifying agent which will give oil-in-water emulsions is satisfactory for use in the present invention. Satisfactory types of emulsifying agents are the polyethylene glycol ethers of long chain alcohols; quaternary ammonium salts; the tertiary amine or alkylol amine salts of long chain alkyl acid sulfate esters, alkyl sulfonic acids or alkyl aryl sulfonic acids; and alkali metal salts of high molecular weight organic acids. Nonionic agents are preferred when polymers containing ester groups are emulsified. The pH can then be regulated to a neutral value to minimize any tendency toward hydrolysis. Salts of the high molecular weight organic acids are preferred emulsifying agents with products containing ether linkages. Tall oil and rosin are preferred organic acids for use in this connection. A useful method of incorporating such salts is to mix the acid, e.g., tall oil, with the prepolymer mass and to have the requisite amount of alkali present in the aqueous bath, so as to form the emulsifier in situ. Although there is presumably some reaction between the acid and the free isocyanato groups in the prepolymer, this is not significant if the mixture is fairly promptly added to the aqueous bath. From 2% to 5% of the emulsifying agent based on the weight of the water employed will usually be found sufficient to produce stable emulsions. When a fatty acid soap is used as the emulsifying agent, care must be taken that the soap is not destroyed by acidic substances. The pH should be maintained at least as high as that of an aqueous solution of the soap if stable latices are desired. For most fatty acid soaps the pH should be at least 9. It should be noted that the carbon dioxide formed by the chain extension of the isocyanato groups with water is acidic and uses up free alkali in the latex, so that an excess of alkali should be used to compensate for this. The polymer may be coagulated from its aqueous dispersion or latex by methods normally employed in the coagulation of rubber or synthetic elastomers from their latices. Common methods for effecting this coagulation are by the addition of acid, for example, acetic acid, or inorganic salts such as sodium chloride or calcium chloride. Mere acidification is sometimes not sufficient to coagulate the more stable latices. The addition of salt in addition to acid is often desirable. Usually from 20 to 30 parts of sodium chloride per 100 parts of water in the latex will effect coagulation. In some cases, particularly when rosin is used as the emulsifier, the latex may be coagulated by freezing.

The coagulated polymer when removed from the water may be dried on a heated rubber mill or other milling equipment.

The dried polymer may be cured in the same manner as the polymers more particularly described in co-pending Hill application above identified. This is usually accomplished by milling into the polymer an organic diisocyanate, such as 2,4-tolylene diisocyanate dimer or N,N'-bis(3-isocyanato-4-methylphenyl)urea, in a ratio of from 4 to 8 parts per 100 parts of polymer while it is being worked on a rubber mill at temperatures of less than 100° C., and then curing the mixture by molding and heating to from 100° to 150° C. for from 15 to 60 minutes.

Thin films of the dried polymer may be treated with organic diisocyanates, either by dipping into a liquid diisocyanate or a solution thereof or by exposure to the vapors of a diisocyanate, and then cured by heating. It appears that the diisocyanate can penetrate into the thin film sufficiently rapidly to permit curing of the film. Alternatively, a curing agent may be dispersed in the latex so that when a film is formed the curing agent is homogeneously distributed in the coagulated film and it is only necessary to dry and heat to cure the film. Obviously, such curing agents must be stable under the conditions in the latex. Products having blocked or hindered —NCO groups which are liberated or become active when heated are suitable for this use.

When the initial reaction between an organic diisocyanate and a polyalkylene ether glycol is carried out in the essential absence of water, the latex formed requires additional polyisocyanate for the formation of a cured elastomer. When a small, controlled amount of water is present during the prepolymer formation, the resulting latex yields products which are tough and elastic and resemble cured natural rubber. By varying the amount of water present during the initial reaction, various degrees of cure in the final product can be obtained.

The following examples are given to illustrate the invention. The parts used are by weight.

*Example 1*

Into a reaction vessel equipped with agitator, thermometer, reflux condenser and Deane and Stark water trap there is placed 460 parts of normal octane. The octane is heated to from 50° to 60° C. and 100 parts of polytetramethylene ether glycol of average molecular weight 2550 are added. The mixture is heated to boiling and approximately 57 parts of the octane along with a little water are removed by distillation in order to dry the mixture. The solution is cooled to 115° C. and 10.2 parts of 2,4-tolylene diisocyanate are added with stirring (the mol ratio of diisocyanate to polyglycol is 1.5:1). The mixture is stirred at approximately 115° C. for 1½ hours. It is cooled to 70° C. without agitation and the syrupy lower layer comprising 150 parts, containing the "prepolymer" and n-octane, is separated off. This prepolymer solution is run slowly over a period of two hours into a solution of 9.0 parts of "Emulphor" O, a condensation product of a long chain fatty alcohol with 16 to 18 mols of ethylene oxide, in 200 parts of water while agitating with a high speed agitator. Agitation is continued for ½ hour after the mixture is all added. The milky latex which is thus formed is quite stable and is still well dispersed at the end of five weeks. A portion of this latex is treated with salt in the proportion of 20 parts of salt per 100 parts of the latex, thus precipitating the polymer. The polymeric mass is removed and washed with water on a rubber wash mill, then dried at 100° C. on a smooth rubber mill. A smooth plastic elastomer is obtained. It has an intrinsic viscosity of 1.33.

*Example 2*

Into the vessel of Example 1 are placed 182 parts of n-octane which is heated to 50° to 60° C. 200 parts of a polytetramethylene ether glycol (average molecular weight 2590) are added and 56 parts of the solvent are distilled through the trap to remove residual water. The charge is then cooled to 115° C. and 20.2 parts of 2,4-tolylene diisocyanate are added. The mass is stirred at from 105° to 110° C. for 2 hours and then at 115° C. for an additional 45 minutes. 8 parts of Nancy Wood rosin are then added. This is dissolved after stirring for about 10 minutes.

This mixture is stirred into 400 parts of water having 4.4 parts of sodium hydroxide dissolved in it. The mixture is emulsified by stirring for 4 minutes with an Eppenbach "Homomixer" operating at 5400 r.p.m. A creamy emulsion with no visible large particles is formed. The temperature at this time is from 60° to 70° C. The mixture is then stirred for 2 hours at slow speed with a paddle agitator. The emulsion has the typical appearance of a polymer latex. The pH is 11.4.

After standing for 5 days a portion of the latex is coagulated by acidifying with 50% acetic acid to a pH of 4. The polymer separates in a coherent mass which is washed with water on a corrugated rubber mill for 15 minutes and then dried on a smooth rubber mill for 30 minutes at 105° C.

100 parts of the resulting soft polymer are compounded on a mill with 6 parts of di(3-isocyanato-4-methylphenyl)-urea to form a smooth sheet. A portion is put in a ring mold and cured in a press at 134° C. for 30 minutes. The rubbery rings have the following properties when tested under water at 25° C.:

Tensile strength at the break _____lbs./sq. in__ 3660
Modulus at 300% elongation _____lbs./sq. in__ 540
Elongation at the break _____percent__ 520

*Example 3*

Into the apparatus of Example 1 are placed 112 parts of n-octane which is heated to 50° to 60° C. 200 parts of a polytetramethylene ether glycol of average molecular weight 2590 are then added and the mixture heated to boiling and 60 parts of solvent are distilled off to remove residual water. The charge is cooled to 115° C. and 20.2 parts of 2,4-tolylene diisocyanate are added. The mixture is stirred at from 105° to 110° C. for 2 hours and at 115° C. for an additional 45 minutes. 8 parts of tall oil (acid No. 180) are then added and the mass stirred for about 10 minutes to dissolve it.

The mass is then poured into a solution of 4.9 parts of sodium hydroxide in 400 parts of water and emulsified by stirring with an Eppenbach "Homomixer" turning at 5400 r.p.m. for 4 minutes. It is then stirred overnight at slow speed with a paddle agitator. The creamy latex has a pH of 12.2.

Films of the polymer are formed on a cylindrical glass mold by dipping first into a coagulating solution, then into the latex and then into the coagulant. The coagulating solution has the following composition:

356 parts of methanol
118.5 parts of acetone
95 parts of Ca(NO$_3$)$_2$.4H$_2$O
120 parts of CaCl$_2$ After washing with water, the films may be stripped from the glass mold without tearing.

Two films on molds are soaked in water for 2 hours after dipping, air dried for 72 hours at room temperature and then dried in an oven at from 105° to 110° C. for 15 minutes. They are then cooled. The films are dipped into 2,4-tolylene diisocyanate, one for 30 seconds and one for 5 seconds. The excess is shaken off and the films are dried in air for 0.5 hour and 2 hours, respectively. They are cured by heating in an oven at 134° C. for approximately 45 minutes. The films are alike and are non-tacky and elastic and can readily be stripped from the molds without damage.

*Example 4*

Into the apparatus of Example 1 are placed 91 parts of n-octane and 105 parts of polytetramethylene ether glycol of average molecular weight 2590. The charge is heated to boiling and 28 parts of solvent are distilled off to remove residual water. The charge is cooled to 115° C. and 10.6 parts of 2,4-tolylene diisocyanate are added (molar ratio: 1.5 2,4-tolylene diisocyanate/1.0 polytetramethylene ether glycol). The mixture is stirred at about 115° C. for 2.5 hours and then cooled to 70° C. It is poured into 200 parts of water containing 1.7 parts of sodium hydroxide and 3.8 parts of the sodium salt of the sulfuric acid ester of a mixture of long chain alcohols, said mixture containing principally dodecyl and tetradecyl alcohols with minor amounts of decyl and hexadecyl alcohols. The mixture is emulsified by stirring with an Eppenbach "Homomixer" at 5400 r.p.m. for 4 minutes. The temperature is between 30° and 50° C. After this it is stirred slowly overnight with a paddle agitator. A stable latex is formed. It is not coagulated by acidification of the latex. However, the acidified latex may be precipitated by saturating it with sodium chloride. The polymer separates in the form of rubbery crumbs which may be washed with water on a corrugated rubber mill and then dried on a smooth mill at 105° to 110° C. to form a smooth, tough, rubbery sheet.

*Example 5*

In the apparatus of Example 1 there are placed 70 parts of n-octane and 198 parts of polytetramethylene ether glycol (average molecular weight 2590) and 45 parts of solvent are distilled off to remove residual water. The charge is cooled to 115° C. and 20.1 parts of 2,4-tolylene diisocyanate are added. The mixture is stirred at 115° C. for 2.5 hours. Then 8 parts of tall oil (acid No. 180) are added and stirring continued for 10 minutes to dissolve it. The charge is cooled to 80° C. and poured into 400 parts of water containing 0.55 part of sodium hydroxide and then emulsified with an Eppenbach "Homomixer" run at 5400 r.p.m. for 2 minutes. The speed is reduced to about 1000 r.p.m. and 9.4 parts of m-tolylene diamine dissolved in 50 parts of water at 70° to 80° C. are added. The speed of the "Homomixer" is then increased to 5400 r.p.m. for 0.5 minute. The latex thus formed is stirred slowly overnight. The residual —NCO groups on the prepolymer appear to react preferentially with the —NH$_2$ groups on the diamine rather than the water. The polymer thus formed is diamine chain-extended.

A cylindrical glass mold is dipped first into the coagulating solution of Example 3, then into the latex and again into the coagulant. It is washed in water and then dried in air and finally in an oven at 109° to 110° C. The film is cured by dipping it into 2,4-tolylene diisocyanate, air-drying and then heating at 134° C. for 40 minutes. The resulting film is stripped off the mold and is non-tacky, elastic and has a high modulus.

*Example 6*

300 parts of polytetramethylene ether glycol (average molecular weight 2970) are stirred with 31.6 parts of 2,4-tolylene diisocyanate at 100° C. for 2 hours. There are then added 12 parts of tall oil (acid No. 180) and stirring is continued for 15 minutes. The viscous mass is cooled to 90° C.

225 parts of the above mass are poured into 200 parts of water in which there is dissolved 1 part of sodium hydroxide. This is then emulsified with an Eppenbach "Homomixer" for 2 minutes. There are added 4.9 parts of m-tolylene diamine dissolved in 50 parts of water at about 70° C. and stirring with the Eppenbach is continued for 3 minutes longer. The emulsion thus formed is stirred slowly overnight. A smooth, stable latex is formed which has a pH of 9.7.

A portion is acidified with acetic acid and a mass of polymer coagulates. This is washed on a corrugated rubber mill with water until free of acid and then dried on a smooth rubber mill at 105° to 110° C. for 30 minutes to give a smooth, rubbery band.

100 parts are milled with 8 parts of N,N'-bis(3-isocyanato-4-methylphenyl)urea and then put into molds in the form of rings and cured for 60 minutes at 134° C. The resulting rubbery rings are tested in water at 25° C.

Tensile strength at the break _____lbs./sq. in.__ >4830
Modulus at 300% elongation _____lbs./sq. in.__ 1460
Elongation at the break _____percent__ >500

*Example 7*

Into a vessel equipped with agitation and a reflux condenser having a solvent-water separator attachment are placed 134 parts of polytetramethylene ether glycol of average molecular weight of 750 and 54 parts of toluene. The mixture is heated to reflux and a small amount of water in the glycol is removed by azeotropic distillation. The toluene is returned to the reaction vessel from the water separator. The vessel is then cooled and 36 parts of hexamethylene diisocyanate are added. The mixture is heated at 90° C. for 2.5 hours while agitating. Then 6.7 parts of tall oil are added and thoroughly mixed in.

Into a vessel which permits the use of a high speed emulsifier such as an Eppenbach "Homomixer" are placed 245 parts of water, 0.65 part of sodium hydroxide and 4.36 parts of m-toluene diamine. This mixture is stirred and warmed to obtain solution and then 174 parts of the previously formed prepolymer mass are stirred in. The mixture is stirred with the "Homomixer" for 3 minutes. A stable emulsion or latex is formed. (Molar ratios are 1.0 polytetramethylene ether glycol/1.2 hexamethylene diisocyanate/0.2 m-toluene diamine.)

To about 100 parts of the latex are added about 2–3 parts of a 5% calcium chloride solution whereupon a crumbly mass separates. This is put on a rubber wash mill and washed with water until free of calcium chloride. It is then dried on a rubber mill at 110° C. to give a smooth, easily banded polymer.

To 10 parts of the polymer on a rubber mill are added 0.6 part of N,N'-bis(3-isocyanato-4-methylphenyl)urea. After thorough mixing, the mass is placed in a mold and cured in a press at 134° C. for 30 minutes. A good, snappy slab of elastomer is obtained.

Similar results are obtained when a polytetramethylene ether glycol of average molecular weight 7000 and methylene-bis(4-cyclohexylisocyanate) are substituted in equivalent molar ratios for the 750 molecular weight glycol and hexamethylene diisocyanate. The resulting rubbery slab is not as snappy in this case.

*Example 8*

In the equipment used in Example 7 are placed 134 parts of polytetramethylene ether glycol of average molecular weight 7000 and 108 parts of toluene. The small amount of water present is removed by azeotropic distillation, the toluene being returned to the reaction vessel. The mass is then cooled and 9.04 parts of 4,4'-biphenyl diisocyanate are added. The mass is heated and stirred at 90° C. for 2.5 hours. Then 6.7 parts of tall oil are thoroughly mixed in.

245 parts of water, 0.65 part of sodium hydroxide and 7.0 parts of m-tolylene diamine are stirred and warmed in the emulsifying vessel. To this are added 130 parts of the above prepolymer solution. The mass is stirred with the "Homomixer" for 1 minute. An emulsion is formed which breaks after some time. When a coherent mass forms, it is removed, washed with water on a rubber wash mill and then dried on a mill at 115° C. (Molar ratios are 1.0 polytetramethylene ether glycol/2.0 biphenyl diisocyanate/5.6 m-tolylene diamine.) 10 parts of the dried polymer are milled with 0.5 part of 2,4-tolylene diisocyanate, put in a mold and heated in a press at 134° C. for 30 minutes. A smooth, snappy, rubbery slab of elastomer is obtained. After remaining under n-heptane for 4 days a strip of the slab is swelled only slightly.

*Example 9*

267 parts of polytetramethylene ether glycol of average molecular weight 2880 and 100 parts of n-octane are placed in a reaction vessel and 60 parts of the octane are distilled off to remove the small amount of water present in the glycol. Then 23.4 parts of 2,4-tolylene diisocyanate (molar ratio—1.0 polyglycol/1.5 diisocyanate) are added and the mass is heated at 115° C. for 2.5 hours while stirring. Then 13.4 parts of tall oil are added. 256 parts of this prepolymer are then poured into 200 parts of water containing 1 part of sodium hydroxide and emulsified with the "Homomixer" for 1 minute. Then 2.12 parts of m-tolylene diamine in 30 parts of water are added and emulsified with the "Homomixer" for 3 minutes. The mixture is then stirred 10 minutes with a paddle-type agitator (about 60 r.p.m.). Then 2.11 parts of monoethanolamine in 20 parts of water are added and stirring is continued overnight. A stable latex is formed which has a pH of 9.87.

A portion of the latex is coagulated with acetic acid, washed with water on the wash mill and dried at 110° C. on a rubber mill. 100 parts of the dried polymer are milled with 4 parts of N,N'-bis(3-isocyanato-4-methylphenyl)urea and cured in a ring mold under pressure for 60 minutes at 134° C. The rings are tested in water at 25° C. with the following results:

Tensile strength at the break _____lbs./sq. in__ 4060
Modulus at 300% elongation _____lbs./sq. in__ 600
Elongation at the break _____percent__ 620

The scorch properties of this elastomer after compounding with the curing agent are much better than those made without monoethanolamine. On a 134° mill a scorch time of 34 minutes is obtained compared to an average of 5–10 minutes when only m-tolylene diamine is used.

*Example 10*

267 parts of polytetramethylene ether glycol and 100 parts of n-octane are put in a reaction vessel and 60 parts of octane are distilled off to remove the water in the glycol. Then 23.4 parts of 2,4-tolylene diisocyanate are added and the mixture stirred 2.75 hours at 115° C. 13.4 parts of tall oil are stirred in. 257 parts of this prepolymer solution are poured into 200 parts of water containing 1 part of sodium hydroxide and the mixture is emulsified 1 minute with the "Homomixer." Then 2.95 parts of ethylene diamine in 50 parts of water are added and emulsified with the "Homomixer" for 3 minutes. The mass is stirred overnight with a paddle agitator. A stable latex is formed from which a rubbery polymer is coagulated, washed and dried as in the previous example.

*Example 11*

Into a reaction vessel are placed 134 parts of polyethylene ether glycol of average molecular weight 6000 and 54 parts of toluene. The water is removed by azeotropic distillation, the toluene being returned. Then 32 parts of toluene are distilled off and the mixture is cooled. 7.8 parts of 2,4-tolylene diisocyanate are added and the mass is heated at 90° C. for 2.5 hours while stirring. 6.7 parts of tall oil are added.

128 parts of this prepolymer solution are added to 245 parts of water containing 0.65 part of sodium hydroxide and 2.54 parts of m-tolylene diamine while stirring with the "Homomixer." A stable latex is formed. (Molar ratio—1.0 polyglycol/2.0 diisocyanate/1.25 diamine.)

*Example 12*

134 parts of polypropylene ether glycol of average molecular weight 2025 are put in a reaction flask with 54 parts of toluene. A small amount of water is removed by distilling off 32 parts of the toluene. There are then added 23 parts of 2,4-tolylene diisocyanate and the mixture is heated and stirred at 90° C. for 2.5 hours. It is cooled and 6.7 parts of tall oil are stirred in. Then 166 parts of this prepolymer solution are added to 245 parts of water containing 0.65 part of sodium hydroxide and 7.53 parts of m-tolylene diamine which have been heated to give a solution. The mass is stirred with the "Homomixer" during the addition. A stable latex is formed.

100 parts of the latex are coagulated by adding 2–3 parts of a 5% calcium chloride solution. The coagulum is washed with water on a rubber wash mill and then dried on a rubber mill at 110° C. 10 parts of the polymer are milled on a rubber mill with 0.6 part of N,N'-bis(3-isocyanato-4-methylphenyl)urea and heated in a mold under pressure at 134° C. for 30 minutes. A smooth, homogeneous, rubbery slab is obtained. (Molar ratio—1.0 polyglycol/2.0 diisocyanate/1.25 diamine.)

*Example 13*

134 parts of a polypropylene ether glycol of average molecular weight 750 and 108 parts of toluene are put in a reaction vessel and the water removed by azeotropic distillation, the toluene being returned to the vessel. Then 0.67 part of benzene sulfonyl chloride and 37.3 parts of 2,4-tolylene diisocyanate are added and the mixture stirred and heated at 90° C. for 2.5 hours. 6.7 parts of tall oil are stirred in.

220 parts of this prepolymer solution are stirred into 245 parts of water containing 0.96 part of sodium hydroxide and 6.5 parts of m-tolylene diamine. An emulsion forms by simply stirring. It is stirred for about 5 seconds with a "Homomixer."

100 parts of the emulsion are coagulated by adding 2–3 parts of a 5% calcium chloride solution. The coagulum is washed by working with water and then dried at 115° C. on a rubber mill. 10 parts of the polymer are milled with 0.4 part of 2,4-tolylene diisocyanate and heated in a press for 45 minutes at 134° C. A somewhat tacky, elastic slab is obtained which shows no swelling when immersed in n-heptane for 4 days and no stiffening when held at −20° C. for 24 hours. (Molar ratio—1.0 polyglycol/1.2 diisocyanate/0.4 diamine.)

*Example 14*

1000 parts of polytetramethylene ether glycol of average molecular weight 3150 and 400 parts of toluene are dried while removing 240 parts of toluene by azeotropic distillation. To the solution is added 82.8 parts of 2,4-tolylene diisocyanate and the mixture is stirred and heated at 90° C. for 2.5 hours. 50 parts of tall oil are then stirred in.

A solution of 1000 parts of water, 5.96 parts of sodium hydroxide and 21.3 parts of m-tolylene diamine is prepared by heating.

A "Homomixer" is placed in a stainless steel vessel fitted with an overflow line. Then the prepolymer solution and the water solution are added simultaneously while the "Homomixer" emulsifies the mass. The prepolymer solution is added at a rate of 178 parts per minute and the aqueous solution at 165 parts per minute. A stable latex is thus formed in a continuous manner. Cured elastomers prepared from this latex have the same properties as those prepared by the batch procedure.

*Example 15*

To 1072 parts of an anhydrous polytetramethylene ether glycol of average molecular weight 945 is added 0.31 part of water which is thoroughly mixed in. 256.5 parts of 2,4-tolylene diisocyanate are added and the mixture stirred and heated at 90° C. for 2.5 hours. To 248 parts of this prepolymer are added 8 parts of Nancy Wood rosin which is thoroughly mixed in. This prepolymer mass is placed in a vessel and a solution of 1.3 parts of sodium hydroxide and 11.62 parts of m-tolylene diamine in 250 parts of water is added and the mixture stirred with a "Homomixer" for 4 minutes. A stable latex is formed. (Molar ratio—1.0 polyglycol/0.015 water/1.3 diisocyanate/0.45 diamine.)

*Example 16*

450 parts of polytetramethylene ether glycol having a molecular weight of 2550, a zero acid number, and containing 0.19% water, and 54.4 parts of 2,4-tolylene diisocyanate are stirred together at 90° C. for 2.5 hours. (Molar ratio of reactants polyglycol-1.0/water-0.27/diisocyanate-1.77.) At the end of this time the reaction mass is a viscous liquid analyzing 1.70% —NCO groups, 1.03 equivalents of —NCO per mol of polytetramethylene ether glycol.

There are then added 22.5 parts of tall oil which is stirred in for about 5 minutes.

468 parts of the mixture are added gradually to 896 parts of water containing 3.81 parts of dissolved sodium hydroxide while stirring with the "Homomixer." The temperature of the drowning solution is about 60° C. Stirring is continued for 5 minutes after all the isocyanate mass has been added. The pH of the resulting latex is 10.1. After stopping the agitation with the "Homomixer," 1 part of sodium hydroxide (as a dilute solution) is added with ordinary agitation during the ensuing hour to maintain the pH above 9.3 so as to obtain a stable latex.

A film is formed on a cylindrical glass mold by the dipping procedure of Example 3. The film is soaked in water for about 2 hours and then dried in an oven at 70° C. The resulting film is tough and elastic and resembles thin sheets of cured natural rubber.

*Example 17*

An ethylene propylene adipate polyester is prepared by heating 3 mols of ethylene glycol, 1 mol of 1,2-propylene glycol and 2.66 mols of adipic acid gradually to 210° C. over a period of 10 hours while distilling off water. Heating at 210–220° C. at a pressure of 1 mm. of mercury is then carried on for about 4 hours. The resulting viscous liquid polyester has a hydroxyl number of 40.9, an acid number of 1.6, a water content of 0.1% and a molecular weight of 2630.

184 parts of this polyester (0.07 mol, containing 0.01 mol water) and 20 parts of 2,4-tolylene diisocyanate (0.115 mol) are heated together at 105–110° C. for 45 minutes. The resulting viscous "prepolymer" shows by analysis 67 milli-equivalents of —NCO compared to a theoretical of 70.

A solution of 2.21 parts of sodium hydroxide in 334 parts of water is prepared. To the prepolymer, which weighs 204 parts, is added 6.8 parts of tall oil which is thoroughly mixed in. The prepolymer is poured into the alkaline water while stirring with an Eppenbach "Homomixer." This requires 2 minutes. Stirring is continued an additional 3 minutes. The maximum temperature is 39° C. An emulsion forms readily. The pH of the emulsion is 9.0.

A film is prepared on a cylindrical mold by dipping, using the same coagulant as in Example 3. The film is dried overnight at 70° C. It is transparent and tacky. It is then dipped into a 4% solution of 2,4-tolylene diisocyanate in benzene and heated for 1 hour at 100° C. The cured film is resilient, transparent, non-tacky and elastic when removed from the mold.

*Example 18*

92 parts of the ethylene propylene adipate polyester of Example 25 and 14 parts of 4,4'-biphenyldiisocyanate are heated and stirred together at 110° C. for 45 minutes. The thick, syrupy prepolymer shows, by analysis, 35 milli-equivalents of —NCO, which is the theoretical amount. This prepolymer is extended with 52 parts of toluene and then 4 parts of tall oil are thoroughly mixed in. The solution is poured slowly into 300 parts of water containing 1.3 parts of sodium hydroxide, while agitating with the "Homomixer." Stirring is continued for 3 minutes longer. Upon standing overnight the emulsion creams but is readily dispersed by simple stirring.

100 parts of the dispersion are coagulated by the addition of 30 parts of a 5% solution of calcium chloride. The crumbly coagulum is washed on a wash roll mill and dried on a smooth roll mill at 110° C. to give a smooth sheet. 10 parts of this dried polymer is milled with 0.4 part of N,N'-bis(3-isocyanato-4-methylphenyl)urea and cured in a mold at 134° C. under pressure for 30 minutes. A smooth snappy slab of rubbery appearance and feel is obtained. It has a modulus at 300% elongation of 830 lbs. per square inch.

*Example 19*

42.5 parts of castor oil and 7.5 parts of polyethylene ether glycol having an average molecular weight of 200 are thoroughly mixed and then added over a period of about 30 minutes to an agitated vessel containing 50 parts of 2,4-tolylene diisocyanate. The temperature is allowed to rise to 110–115° C. After the addition is complete, the mass is stirred for 1 hour at 100° C. 30 parts of toluene are added. The mixture is then added slowly with stirring to a solution consisting of 96 parts water, 2 parts of the sodium salt of sulfated long chain alcohols, the alcohols being principally dodecyl and tetradecyl with smaller amounts of hexadecyl and decyl alcohols, 2 parts of casein, and approximately 0.25 part of an anti-foaming agent consisting of 1 part pine oil and 3 parts tributyl phosphate. Agitation is continued for an additional 8 minutes. A white emulsion results.

The emulsion is used as an adhesive. Two pieces of wood are brushed with the emulsion, clamped together under slight pressure and cured in an oven at 110° C. for 30 minutes. The bonded structure is removed from the oven, let stand for 30 minutes and pulled apart. Failure occurred by separation of the wood, leaving the adhesive bond intact.

*Example 20*

835 parts of 2,4-tolylene diisocyanate are put into an agitated vessel and 1016 parts of polytetramethylene ether glycol of molecular weight 1016 are added slowly while maintaining the temperature at 35–40° C. There are added 88 parts of 2-butene-1,4-diol while keeping the temperature at 50–60° C. The mass is stirred at 60° C. for 1 hour. During this preparation an atmosphere of nitrogen is maintained in the reaction vessel.

2 parts of the sodium salt of sulfated long chain alcohols are dissolved in 98 parts of water. To 100 parts of the prepolymer described above are added 30 parts of toluene. This solution is poured slowly into the aqueous solution while agitating with the "Homomixer." Agitation is continued for 8 minutes after the addition is complete. A white emulsion results.

This emulsion is coated onto two pieces of wood which are then clamped together under slight pressure and cured in an oven at 110° C. for 30 minutes. When the glued joint is tested by tension, the wood breaks leaving the adhered portions intact.

*Example 21*

1300 parts of polytetramethylene ether glycol having an average molecular weight of 2560 and containing 0.1% water are stirred with 189 parts of 2,4-tolylene diisocyanate at 90° C. for 3 hours. Analysis shows the presence of 2.44% —NCO groups. 65 parts of tall oil are stirred in. 1460 parts of this prepolymer are gradually added to 2750 parts of water containing 21.2 parts of sodium hydroxide while agitating with a "Homomixer." The maximum temperature is 38° C. The agitation is continued for 3 minutes longer. The pH of the latex so formed is 10.5 and after 18 hours is 9.3.

A curing agent which could be dispersed in the latex is prepared by ball-milling 100 parts of the dimer of 2,4-tolylene diisocyanate, 6.2 parts of the sodium salt of polymerized formaldehyde naphthalene sulfonic acids (sold commercially as "Darvan" No. 1), and 205 parts of water for 48 hours. Then 12.5 parts of a 10% casein solution are added and ball milling is continued for 2 hours longer.

3.3 parts of this curing agent dispersion is stirred into 60 parts of the latex (effective ratio: 5 parts of dimer per 100 parts of polymer). Then a dip film was made on a mold using the coagulant described in Example 3. The film is dried on the form in an oven at 70° C. and then cured at 100° C. for 1 hour. The resulting film is smooth and transparent and after being stripped from the form shows the following properties:

Tensile strength at the break_____lbs./sq. in__ 2280
Elongation at the break_____percent__ 870
Modulus at 300% elongation_____lbs./sq. in__ 480

*Example 22*

A poly(alkyleneether-alkylenethioether) glycol containing repeating units of the structure

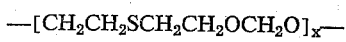

terminated in —OH groups is prepared by mixing together 400 parts thiodiglycol, 100 parts paraformaldehyde, 200 parts benezene and 1 part p-toluene sulfonic acid, distilling to remove water and excess formaldehyde and heating to 150° C. at 1 mm. pressure. The resulting polyglycol has a molecular weight of 1500.

90 parts of the poly(alkyleneether-alkylenethioether) glycol and 30 parts of 2,4-tolylene diisocyanate are mixed and heated at 100° C. for thirty minutes. There are then added 6 parts of tall oil and stirring is continued for fifteen minutes. The mass is then poured into a vigorously agitated solution of 1 part of sodium hydroxide in 200 parts of water. The mixture is emulsified using a "Homomixer," giving a smooth, stable latex. When a portion is acidified after standing overnight, a coagulum forms which after washing and drying is rubbery. 100 parts of this product are milled with 8 parts of N,N'-bis(3-isocyanato-4-methylphenyl) urea and cured in a press at 130° C. under pressure for 30 minutes. A smooth, amber elastic slab is obtained which has good tensile strength and exhibits very little swelling upon standing in water or in n-hexane.

As illustrated in the above examples, either water itself may be employed as the chain extending agent, or water-soluble primary diamines. One hydrogen on each of the diamine radicals reacts preferentially with the free isocyanato groups remaining in the initial addition product much more readily than does the hydrogen atom in the water, and therefore the chain is extended chiefly by reaction with the diamines even though employed in water solution. The amount of diamine ordinarily employed will be that equivalent to the unreacted isocyanato groups remaining in the initial addition product. It will be obvious, however, that lesser amounts may be employed, for the chain extension of the initial addition product will be completed with the water in which the amine is dissolved. Typical examples of diamines which may be employed are phenylene diamine, tolylene diamines, cyclohexylene diamines, propylene diamines and ethylene diamine. The amine may be added before or after the dispersion of the "prepolymer" in the water.

The chain extension step is not necessarily a fast reaction so it is frequently desirable to agitate the emulsion for some time after its initial formation. This is usually accomplished by means of a conventional paddle type agitator at 30–90 r.p.m. This aids in contacting the emulsion droplets with the chain extender.

The solvent used in carrying out the initial addition reaction may be any inert organic solvent which has a boiling range from about 90° to about 140° C. where the reaction is carried out in open equipment. Lower boiling solvents may of course be used where the reaction is carried out in closed equipment to prevent boiling off the solvent at the temperatures of the reaction. Solvents boiling at substantially more than 140° C. are difficult to remove from the coagulated elastomer at desirable working temperatures, although it will be obvious that higher boiling solvents may be employed where the excess solvent is removed by means other than by heating or distillation. The solvents to be used are preferably those in which the reactants have some solubility but in which the final elastomer is insoluble. The aliphatic hydrocarbon solvents such as the heptanes, octanes and nonanes, or mixtures of such hydrocarbons obtained from naturally occurring petroleum sources such as kerosene, or from synthetically prepared hydrocarbons, may be employed. Cycloaliphatic hydrocarbons such as methylcyclohexane and aromatic hydrocarbons such as toluene may likewise be used. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution.

Elastomers prepared by the method of this invention have many varied uses in common with other elastomers. Among the many articles and uses to which these products are applicable may be mentioned the following: pneumatic tires, of which either the carcass, the tread or side wall or any combination may be of these materials; also the chafing strip, the rubbing strip on the outside of the tire, friction stock for cord in the tire carcass, and the inner liners of tubeless tires; the elastomer may be reinforced with glass fiber and metal wire as well as cotton, rayon, nylon, etc., solid tires, either cast or molded as complete tires or as the tread over another elastomer; inner tubes, either plain or puncture-proof and alone or in combination with other elastomers; belts for power transmission, for conveying materials for timing, either flat, round, or V-shaped and made completely of the polymeric products of this invention or laminated with fabric or other elastomers or wire such as cotton, glass fiber, asbestos, nylon, rayon, polyester fiber, polyacrylonitrile, metal wire, the top or wearing surface usually being of these new products due to their excellent abrasion resistance (oxides of metals such as antimony or zinc may be added during compounding to increase fire resistance); hose for liquids, slurries, solids (abrasive), dusts, gases, solvents, corrosive materials, fume ducts, all of which may be reinforced in the same way as the belts described above; tubing, which is unsupported hose, and may be formed completely of these products or laminated with other polymers and elastomers; mechanical goods, molded, extruded, lathe cut, stamped out, cast, or dipped, such as grommets, sealing rings, channel rubbers, packing gaskets, mountings, bellows, matting (floor covering), tile, rolls, oil-well swabs, pipe-wipers, slush pump pistons, packers, tractor cleats, tank tread blocks, drug sundries, etc.; wire and cable jackets resistant to abrasion, weather, and ozone, which may be entirely composed of the polymer products of this invention or which have this as an outer layer on top of another insulator, in either of which reinforcing fabric or metal may be incorporated; footwear, soles, heels, uppers either from the polymers of this invention or from these materials compounded or laminated with a variety of other materials such as cork, fabric, leather, elastomers, plastic polymers, etc.; coated fabrics of cotton, glass fibers, rayon, wool, polyacrylonitrile, polyester fibers, leather, paper, plastics, or laminates of these with other elastomers, prepared by dipping spreading or calendering; films in the form of gloves, balloons, diaphragms, sheeting, wrapping film, etc.; coating or paint compositions for wood, metal, plastic, concrete, brick, ceramics, leather, etc.; adhesives, in the form of uncured sheets or solvent solutions or suspensions for bonding various materials to each other, such as metals, wood, plastic, ceramics, leather, fabrics, elastomers, in the formation of any of the herein-mentioned products containing a combination of elements; cellular products which may be expanded with a blowing agent, for use as sealing strips, cushions, gaskets, matting, shoe soles, vibration dampeners, shock absorbers, packaging material or buoyant articles; eletrically conductive elastomeric articles when compounded with conductive materials such as certain carbon blacks and powdered metals.

The basic elastomeric properties of the elastomers may be varied by suitable compounding. The amount and type of compounding agent incorporated in the stock is dependent upon the use for which the elastomer is intended. Included among such of the more important useful compounding agents are carbon black, clay, silica, talc, zinc and magnesium oxides, calcium and magnesium carbonate, titanium dioxide and plasticizers. Inorganic and organic coloring agents may be incorporated to give well defined colors since the natural color of the elastomer is a pale yellow or light amber.

The compounding agents may be mixed or incorporated with the product at the time of the incorporation of the vulcanizing diisocyanate. Conventional rubber processing machinery such as mills or Werner-Pfleiderer or Banbury mixers may be used. The resulting compounded stocks may be shaped and cured in conventional rubber industry equipment. Additionally, the stocks may be dissolved in or extended with appropriate solvents for application to surfaces and then cured thereon after evaporation of the solvent.

As illustrated in the examples, elastomer latices prepared according to this invention may be employed in the manufacture of dipped goods by the same general procedure employed in the manufacture of dipped goods from natural rubber or other synthetic elastomer latices.

This application is a continuation-in-part of my application Serial No. 365,241, filed June 30, 1953, now abandoned.

I claim:

1. In the process for the manufacture of stable elastomeric latices in the form of high molecular weight reaction products of organic diisocyanates, the step of effecting chain extension of an initial addition product by emulsifying said product in an aqueous medium with agitation in the presence of an emulsifying agent, said agent being one which will give oil-in-water emulsions, said initial addition product having been obtained by reaction of an organic diisocyanate with an organic compound, the molar ratio of diisocyanate to organic compound being between about 1.2:1 to 10:1, said organic compound containing at least two active hydrogen atoms which display activity according to the Zerewitinoff test, having a molecular weight of at least 750 and being selected from the group consisting of polyalkyleneether glycols, poly(alkyleneether-alkylenethioether) glycols, alkyd resins, esters of polyhydric alcohols and hydroxy fatty acids and polyesteramide resins.

2. The process of claim 1 in which the aqueous medium contains an amount of a primary organic diamine sufficient to react with all of the free isocyanato groups in said initial addition product.

3. The process of claim 1 in which the organic compound having a molecular weight of at least 750 is a polyalkylene ether glycol.

4. The process of claim 3 in which the polyalkyleneether glycol is a polytetramethyleneether glycol.

5. The process of claim 1 in which the organic compound having a molecular weight of at least 750 is a poly(alkyleneether-alkylenethioether) glycol.

6. The process of claim 1 in which the organic compound having a molecular weight of at least 750 is an alkyd resin containing terminal hydroxyl groups and is obtained by reaction of a glycol and a dicarboxylic acid.

7. The process of claim 1 in which the organic compound having a molecular weight of at least 750 is castor oil.

8. The process of claim 2 in which the diamine is m-tolylene diamine.

9. The process of manufacturing a stable elastomeric latex which comprises effecting reaction, in a hydrocarbon solvent having a boiling point of from about 90° C. to about 140° C., between 2,4-tolylene diisocyanate and a polytetramethyleneether glycol having a molecular weight of between about 750 and about 4000, the molar ratio of diisocyanate to glycol being between about 1.2:1 and 2:1, and thereafter effecting chain extension of the initial addition product by emulsifying said addition product and solvent in water with agitation in the presence of an emulsifying agent, said agent being one which will give oil-in-water emulsions.

10. A stable elastomeric latex comprising an aqueous dispersion of the reaction product of (1) an isocyanato-terminated polymer, said polymer being formed by reacting an organic diisocyanate with an organic compound containing at least two active hydrogen atoms which display activity according to the Zerewitinoff test, and having a molecular weight of at least 750, said organic compound being selected from the group consisting of polyalkyleneether glycols, poly(alkyleneether-alkylenethioether) glycols, alkyd resins, esters of polyhydric alcohols and hydroxy fatty acids and polyesteramide resins, the molar ratio of diisocyanate to organic compound being between about 1.2:1 to 10:1, and (2) a chain extender selected from the group consisting of water and a primary diamine; said reaction between (1) and (2) being carried out in an aqueous medium with agitation in the presence of an emulsifying agent, said agent being one which will give oil-in-water emulsions.

11. A stable elastomeric latex according to claim 10 wherein the organic compound having a molecular weight of at least 750 is a polyalkyleneether glycol.

12. A stable elastomeric latex according to claim 11 wherein the polyalkyleneether glycol is a polytetramethyleneether glycol and the organic diisocyanate is 2,4-tolylene diisocyanate.

13. A stable elastomeric latex comprising an aqueous dispersion of the reaction product of (1) an isocyanoto-terminated polyurethane formed by reacting 2,4-tolylene diisocyanate with a polytetramethyleneether glycol having a molecular weight between about 750 and about 4,000, the molar ratio of diisocyanate to glycol being between about 1.2:1 and 2:1; and (2) a chain extender selected from the group consisting of water and a primary diamine; said reaction between (1) and (2) being carried out in an aqueous medium with agitation in the presence of from 2 percent to 5 percent of an emulsifying agent based on the weight of the water, said agent being one which will give oil-in-water emulsions.

References Cited in the file of this patent

UNITED STATES PATENTS

| 2,621,166 | Schmidt et al. | Dec. 9, 1952 |
| 2,692,874 | Langerak | Oct. 26, 1954 |
| 2,726,219 | Hill | Dec. 6, 1955 |

FOREIGN PATENTS

| 904,939 | France | Mar. 26, 1945 |

OTHER REFERENCES

The Theory and Application of Colloidal Behavior, by R. H. Bogue, volume I, McGraw-Hill Book Co., New York, N.Y. (1924), page 223.

Chemical Engineering, volume 57, No. 4, pages 165 and 166, April 1950.